United States Patent [19]
Abe

[11] Patent Number: 5,805,305
[45] Date of Patent: Sep. 8, 1998

[54] IMAGE FORMING APPARATUS CAPABLE OF PRODUCING A PSEUDO HALF-TONE IMAGE BY USING DITHER PATTERNS

[75] Inventor: Hideaki Abe, Tokyo, Japan

[73] Assignee: NEC Corporation, Japan

[21] Appl. No.: 880,558

[22] Filed: Jun. 23, 1997

Related U.S. Application Data

[63] Continuation of Ser. No. 549,400, Oct. 27, 1995, abandoned.

[30]    Foreign Application Priority Data

Oct. 28, 1994    [JP]    Japan ................................ 6-265292

[51] Int. Cl.$^6$ ........................................................ H04N 1/40
[52] U.S. Cl. ................................................ 358/457; 358/475
[58] Field of Search ................................ 358/455, 456, 358/457, 465, 451; 382/169

[56]    References Cited

U.S. PATENT DOCUMENTS

4,698,778  10/1987  Ito et al. ............................ 358/451
4,926,268   5/1990  Ilawamura et al. ................. 358/458

*Primary Examiner*—Thomas D. Lee
*Assistant Examiner*—Jerome Grant, II
*Attorney, Agent, or Firm*—Ostrolenk, Faber, Gerb & Soffen, LLP

[57]    ABSTRACT

The present invention is intended to provide an image forming apparatus capable of representing a plurality of gradations by using dither patterns without increasing the pixels in the matrix. The dither patterns are stored in the storage circuit (14). The dither patterns have different numbers of ON bits corresponding to black pixels, and remaining dither patterns have the same number of ON bits which are different patterns. The dither patterns stored in the storage circuit (14) are matrix patterns which have gradation values determined in accordance with variations of gray levels which are caused by effects derived from adjacent pixels. Therefore, the gradation values of the dither patterns are determined according to the position of ON bits regardless of the same number of ON bits. The dither conversion circuit (12) converts multi-level image data to binary image data represented by the dither patterns. The image forming device (2) forms an image according to the binary image data and reproduces the gradations of the dither patterns.

6 Claims, 12 Drawing Sheets

$$\begin{pmatrix} A_{00} & A_{01} & A_{02} \\ A_{10} & A_{11} & A_{12} \\ A_{20} & A_{21} & A_{22} \end{pmatrix}$$

FIG. 8

$$\begin{pmatrix} A_{00} & A_{01} & A_{02} \\ A_{10} & A_{11} & A_{12} \\ A_{20} & A_{21} & A_{22} \end{pmatrix} = \begin{pmatrix} 0.0 & 0.1 & 0.0 \\ 0.1 & 0.6 & 0.1 \\ 0.0 & 0.1 & 0.0 \end{pmatrix}$$

FIG. 11B $$T_{mn} = \begin{pmatrix} 0.00 & 0.01 & 0.00 \\ 0.01 & 0.36 & 0.01 \\ 0.00 & 0.01 & 0.00 \end{pmatrix}$$

IMAGE FORMING APPARATUS CAPABLE OF PRODUCING A PSEUDO HALF-TONE IMAGE BY USING DITHER PATTERNS

This is a continuation of application Ser. No. 08/549,400, filed on Oct. 27, 1995

BACKGROUND OF THE INVENTION

1. Field of the Invention

The present invention relates to an image forming apparatus for forming a half-tone image represented in a multi-density level on an image forming medium and, more particularly to the image forming apparatus which can produce pseudo half-tone image by using dither patterns.

2. Description of the Related Art

A dither method have been used as one of area gradation methods for expressing continuous gray level images only with binary data of white and black. This area gradation method has been developed as to how smooth gradation can be represented and an original image can be faithfully reproduced without deteriorating a resolution.

Figure 1A:
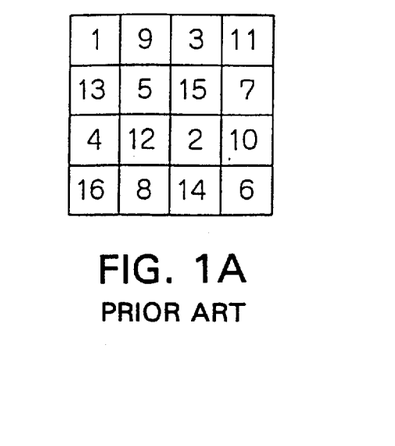
FIG. 1A is a diagram showing an example of a conventional dither matrix.
Figure 1B:
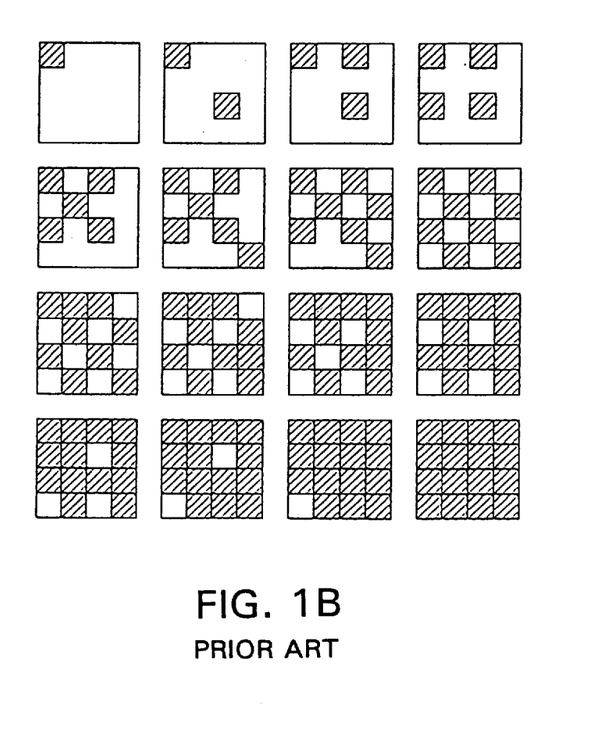
FIG. 1B is a diagram showing conventional dither patterns produced by using the conventional dither matrix of FIG. 1A.

The dither matrix proposed by B. E. Bayan refers to the base for half-tone expression. Black pixels and white pixels of the Bayan's dither matrix are arranged so that a spatial frequency remains highest and deterioration of the resolution can be prevented. Specifically, an average gray level of the dither pattern is gradually increased as shown in FIG. 1B by filling pixels with black in the sequence of numbers of pixels as shown in FIG. 1A. By doing so, the gray level can theoretically be represented in 17 steps as shown in FIG. 2.

Figure 2:
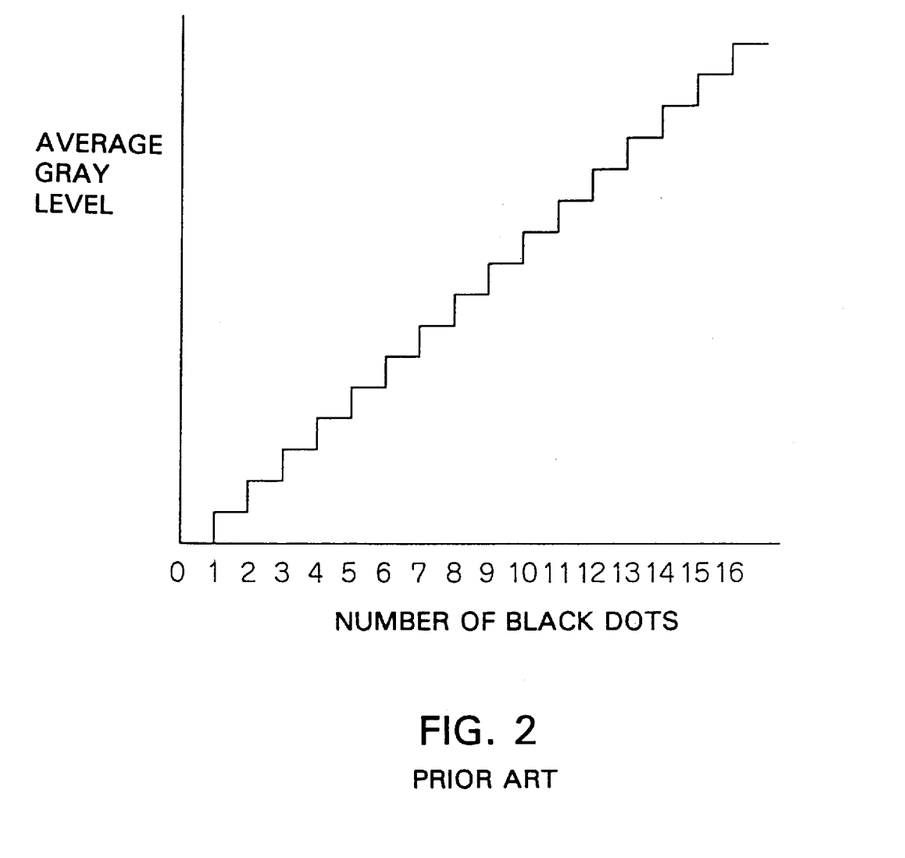
FIG. 2 is a graph showing a theoretical gray level gradation.
Figure 3:
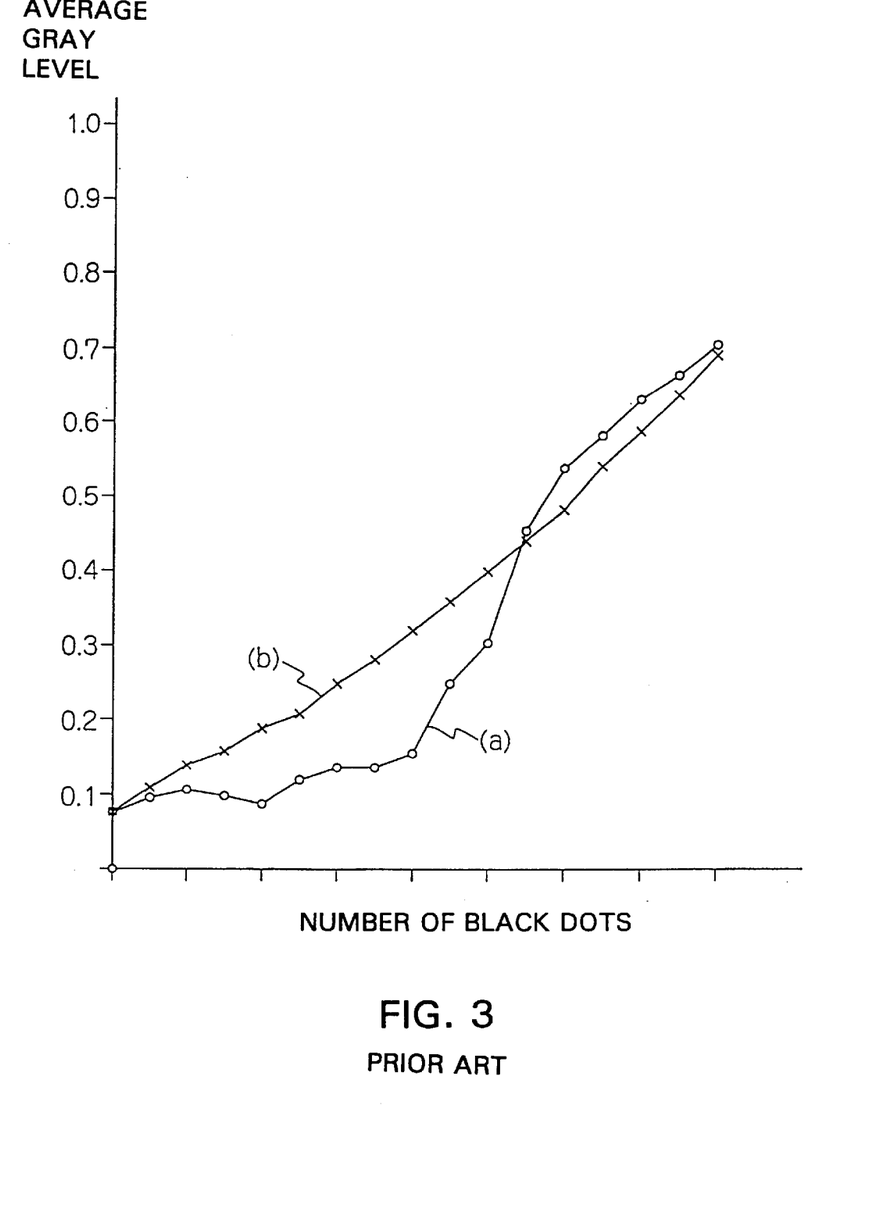
FIG. 3 is a graph showing a gray level gradation based on a conventional dither method.

However, if the area gradation presentation with this Bayan's matrix is applied to an electrophotographic image forming apparatus, it is known that the theoretical result as shown in FIG. 2 cannot be obtained and an average gray level is not proportional to the number of black dots as shown with a curve (a) in FIG. 3, and thus a reversal of the gray level will be caused.

To eliminate the disadvantage of Bayan's matrix, a centralized dither matrix is used in place of the Bayan's matrix. According to the centralized dither matrix, black pixels are arranged from the center of the matrix toward the periphery of the matrix. The centralized dither matrix contributes to improvement of the stability of the gradation characteristic as shown with a curve (b) in FIG. 3. This method has been actually used in many printing machines.

On the other hand, an error diffusion method has been actually used as another half-tone presentation method. It compensate discrete errors which are caused when a continuous gray level gradation is discretely distributed. This error diffusion method diffuses errors caused upon discrete distribution to adjacent matrices while weighing the gray scale and has achieved appreciable results in practical use.

In the above dither method, the number of pixels in the matrix should be large to increase the number of gradations, however, this cause deterioration of the resolution of the whole image which can be represented. When the number of pixels in the matrix decreases to actually raise the resolution, the number of gradations which can be represented is decreased. Thus, increasing the number of gradations and the resolution have been considered incompatible.

The error diffusion method is disadvantageous in that basically an effect of a matrix in which discrete errors occur propagates to adjacent matrices and consequently the resolution is deteriorated. In addition, it is also disadvantageous in that complex calculation is required in processing, and high speed processing cannot therefore be carried out.

SUMMARY OF THE INVENTION

An object of the present invention is to eliminate the disadvantages of the prior art and to provide an image forming apparatus capable of particularly increasing the number of gradations which can be represented by the area gradation method without deterioration of the resolution, and to provide the image forming apparatus which can reproduce the gray scale of half-tone images in high precision.

The image forming apparatus according to the present invention includes a storage circuit which stores dither patterns, a dither conversion circuit and an image forming device which forms an image on an image forming medium. The dither patterns stored in the storage circuit have different numbers of ON bits corresponding to black pixels and the same number of the ON bits which are different patterns. The dither conversion circuit converts multi-level image data represented in the multi-density level to binary image data constructed by the dither patterns from the storage circuit. The image forming device forms an image represented with a plenty of pixels according to the binary image data from the dither conversion circuit.

The dither patterns stored in the storage circuit have different gradation values which denote the grey levels added by variations of the gray level due to the effect of adjacent pixels which is caused during image forming operation. Therefore, a plurality of gradations can be reproduced in spite of the same number of ON bits, and thus the number of gradations can be remarkably increased.

Particularly, if the image forming device is an electrophotographic printer, the dither patterns to be reproduced on a printing medium (photoconductor drum) have the gradation values which are varied due to the effect of adjacent pixels. The effect depends on the relationship between a spot diameter of a laser beam to which a photoconductor drum is exposed and a size of one pixel to be exposed.

Another image forming apparatus of the present invention further includes a control circuit for calculating the gradation values of the dither patterns. The control circuit stores a value of each pixel of a conversion matrix. The conversion matrix is determined in view of the effect from adjacent pixels. Moreover, the control circuit calculates a square of a product of a value of each element of a conversion matrix and a value of each pixel of the dither pattern, and then, calculates an average of the square values. Accordingly, the gray level based on the gradation value of the multi-level image data well agrees with the gray level represented by the corresponding dither pattern.

DETAILED DESCRIPTION OF THE PREFERRED EMBODIMENT

Figure 4:
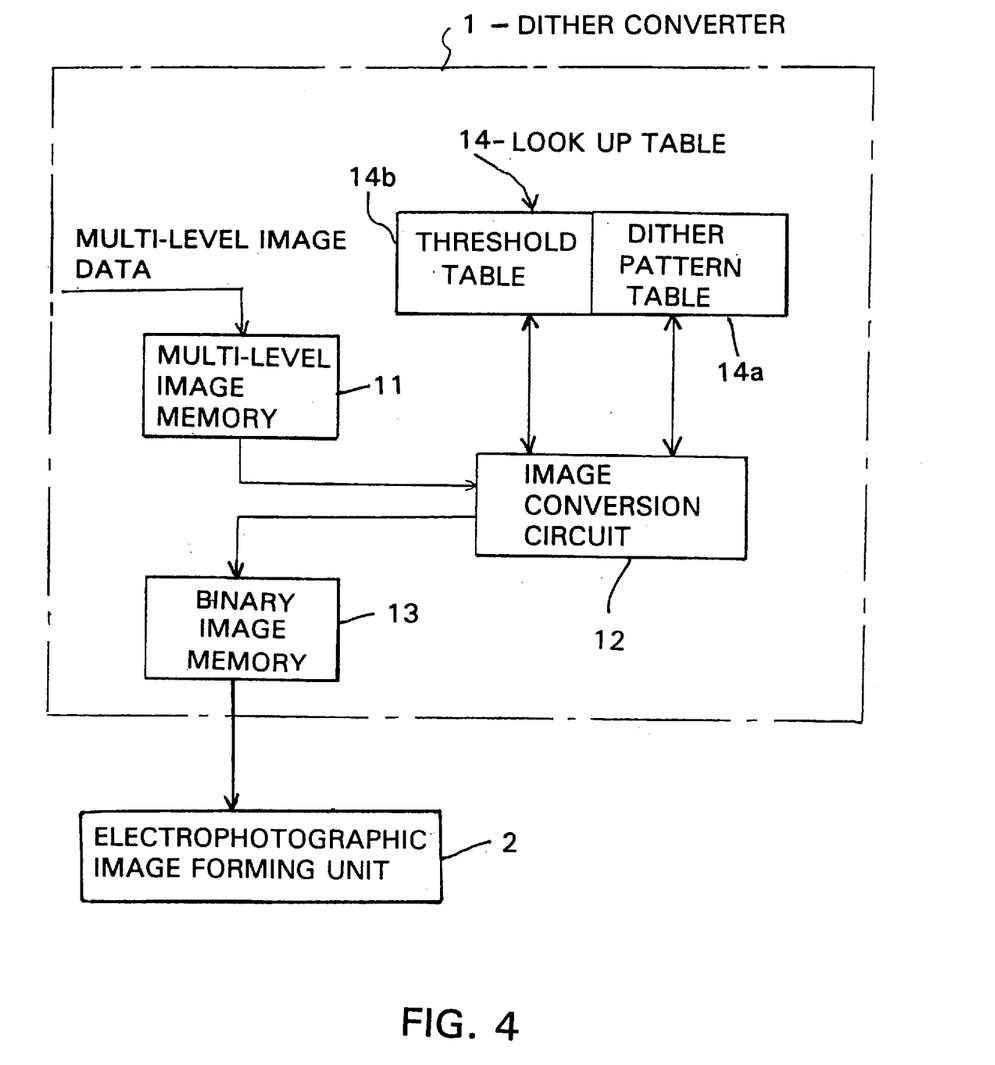
FIG. 4 is a block diagram of an image forming apparatus according to an embodiment of the present invention.

An image image forming apparatus in the embodiment of the present invention shown in FIG. 4 has a dither converter 1 for converting multi-level image data represented in multi-density levels to binary image data represented by dither patterns, and an electrophotographic image forming unit 2 for forming images according to the binary image data on an image forming medium, such as a photoconductor drum. The multi-level image data supplied to the dither converter 1 have multi-level values between 0 to 1. They are obtained by a CCD which scans an original document and a circuit for converting the data values of the multi-level image data to the values between 0 to 1, or obtained by a computer.

The dither converter 1 includes a multi-level image memory 11 for storing the multi-level image data, an image conversion circuit 12 for converting the multi-level image data stored in the multi-level image memory 11 to the binary image data by using the dither patterns stored in a lookup table (memory)14, and a binary image memory 13 for storing the binary image data supplied from the image conversion circuit 12. A RAM (Random Access Memory) is employed in the multi-level image memory 11 and the binary image memory 13. Moreover, the image conversion circuit 12 has a microcomputer and a ROM storing a microprogram. The image conversion circuit 12 and the binary image memory 13 correspond to dither conversion means.

Figure 5:
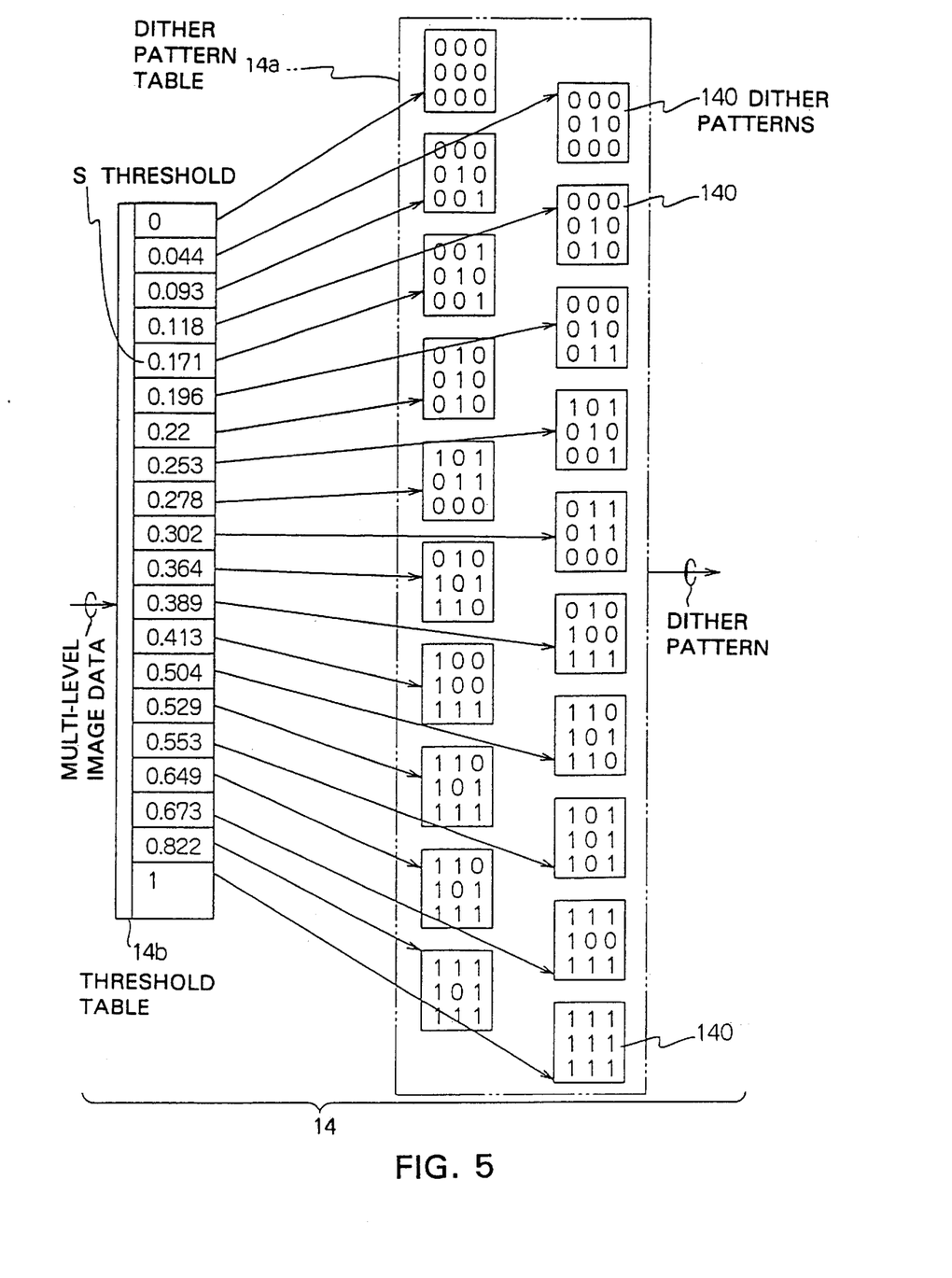
FIG. 5 is a block diagram showing contents of a lookup table of the image forming apparatus shown in FIG. 4.

The image conversion circuit 12 is connected with the lookup table 14 which is referred to in dither conversion of the multi-level image data. As shown in FIG. 5, the lookup table 14 is provided with a dither pattern table 14a for storing a plurality of dither patterns 140 and a threshold table 14b for storing a shreshold which corresponds to a gray level value of each dither pattern 140 stored in the dither pattern table 14a. The dither patterns 140 stored include a plurality of dither patterns having the same number of ON bits (number of black pixels "1") which are different patterns. The image conversion circuit 12 selects the binary image data of the dither patterns from the lookup table 14 corresponding to the multi-level image data, and stores the binary image data in the binary image memory 13.

Figure 6:
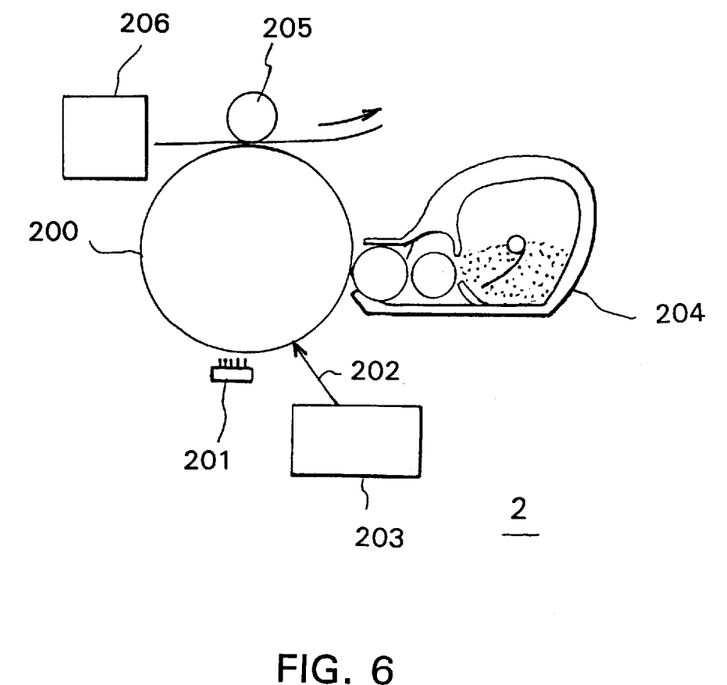
FIG. 6 is a schematic diagram showing an arrangement of an image forming unit of the printing apparatus shown in FIG. 4.

In FIG. 6, the electrophotographic image forming unit 2 forms an image on the image forming medium according to the binary image data stored in the binary image memory 13 and then prints the image to a printing paper. It is provided with a photoconductor drum 200 as the image forming medium, an exposure unit having a laser scan unit 203 for forming a static latent image on an external periphery of the photoconductor drum 200, a developer 204 for develops a toner image on the photoconductor drum 200 according to the static latent image, a transfer unit 205 for transferring the toner image to the printing paper, and a fixing unit 206 for fixing the toner image.

The following depicts a relationship between the dither pattern table 14a and the threshold table 14b.

In FIG. 5, the dither pattern table 14a contains dither patterns of 20 types of 3×3 matrices which are set in view of the gray level enhancement which arises between adjacent pixels. The threshold table 14b stores a plurality of thresholds S for selecting one of the dither patterns 140 which most appropriately reproduces a gray level close on the gradation value of the multi-level image data from the multi-level image memory 11. The maximum value of the thresholds S is 1 and the minimum value is 0. Since the multi-level image data also have data values between 0 and 1, there is the shreshold which is close on the gradation value of the multi-level image data. The image conversion circuit 12 selects the dither pattern which corresponds to the shreshold close on the gradation value of the multi-level image data supplied from the multi-level image memory 11.

Figure 7:
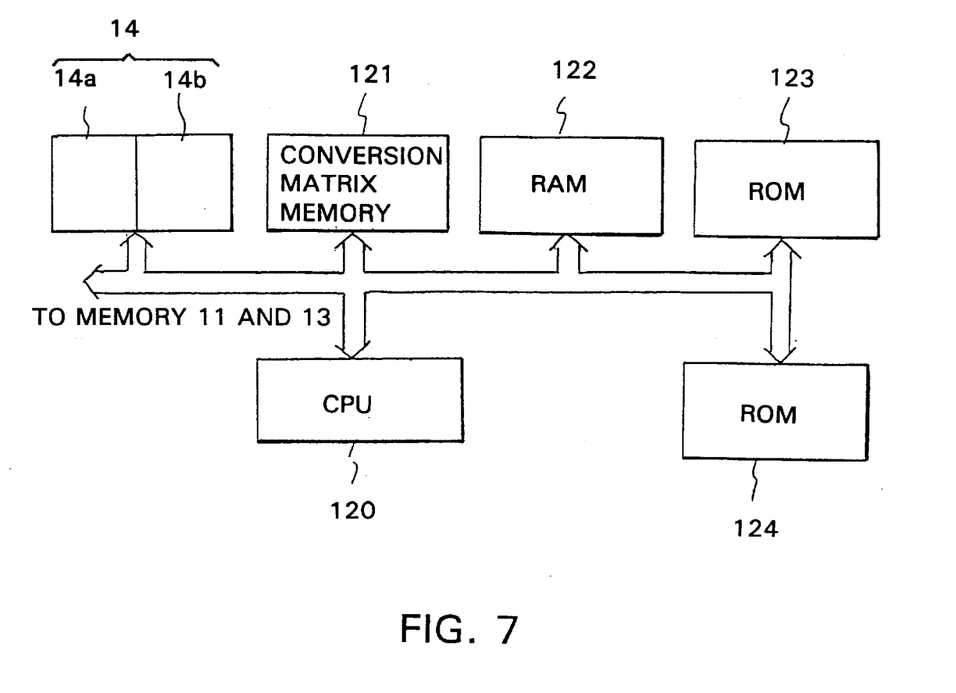
FIG. 7 is a circuit diagram showing an image conversion circuit of the image forming apparatus shown in FIG. 4.

FIG. 7 is a circuit diagram showing the internal circuit of the image conversion circuit 12. The image conversion circuit 12 has a conversion matrix memory 121, RAM 122, ROM 123, and ROM 124 and they are connected to the lookup pattern table 14 through a bus 125.

Figure 8:
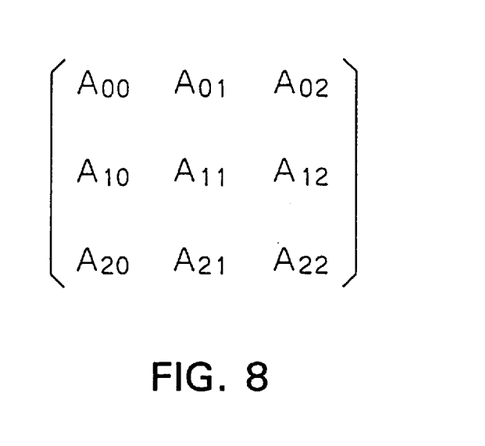
FIG. 8 is a diagram showing a conversion matrix to be stored in the image conversion circuit shown in FIG. 7.
Figure 9:
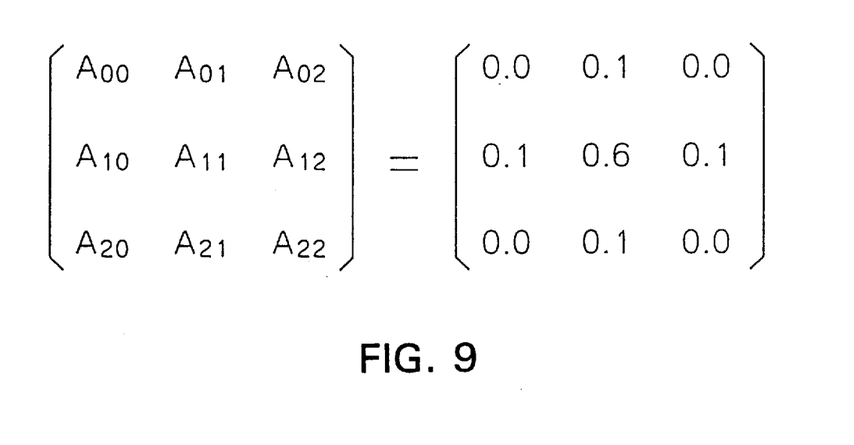
FIG. 9 is a diagram showing an example of the conversion matrix shown in FIG. 8.

The image conversion circuit 12 functions to calculate automatically the thresholds S to be stored in the threshold table 14b. In calculation of the thresholds, the CPU 120 of the image conversion circuit 12 executes the control according to a threshold calculation program stored in the ROM 123. The calculation procedures of thresholds S is as follows:

I) A conversion matrix Amn which represents a degree of effect of adjacent pixels shown in FIG. 8 is stored in advance in the conversion matrix memory 121. The conversion matrix is set to be 3 lines×3 rows. An element A11 at the center of the matrix corresponds to one pixel D1 (a pixel to be affected by an adjacent pixel D2) shown in FIG. 10 and is given a gray level value under a condition that the pixel D1 is not affected by an adjacent pixel D2. Other elements around the element A11 are given gray level values which are respectively added by the gray level due to the effect of adjacent pixels corresponding to respective elements. For example, the gray level value of element A10 increases when a left adjacent element is black and A12 increases when a right adjacent element is black. Similarly, the gray level values are respectively given to elements A01, A02, A12, A20, A21 and A22. Those values to be set for elements A00, A01, A10, A02, A12, A20, A21 and A22 are referred to as adjacent effect coefficients for convenience. These values are determined so that the theoretical gray level values are relatively approximate to the gray level values measured in an experiment. FIG. 9 shows practical preset values. Optimum values of the adjacent effect coefficients differ with the characteristics of the electrophotography image forming unit 2 and particularly depend on a relationship between a spot diameter of the laser beam 202 shown in FIG. 6 to which the photoconductor drum 200 is exposed and a size of one pixel to be exposed by the laser beam. In FIG. 9, the adjacent effect coefficient "0.1" is obtained when the half-amplitude level of the laser beam is almost equivalent to one pixel. Since the effect of a slant adjacent element is little, a value 0.0 is given.

II) The CPU 120 activates a threshold calculating function for calculating the appropriate thresholds S to be stored in the threshold table 14b.

Figure 11A:
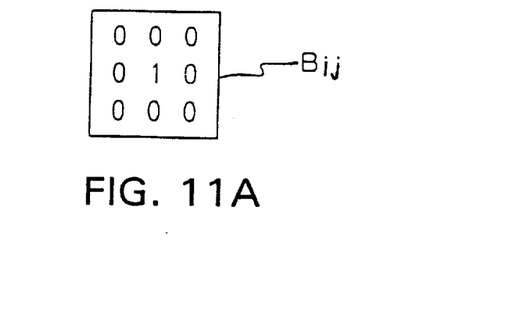
FIGS. 11A, 11B, and 11C are respectively a diagram for depicting a threshold calculation method according to the image conversion circuit shown in FIG. 7.

First, the dither pattern shown in, for example, FIG. 11A is selected from the dither pattern memory 14a. Then, the CPU 120 generates a matrix which is periodically arrayed as shown in FIG. 11B with the dither pattern Bij and the matrix is stored in the RAM 122.

Figure 11B:
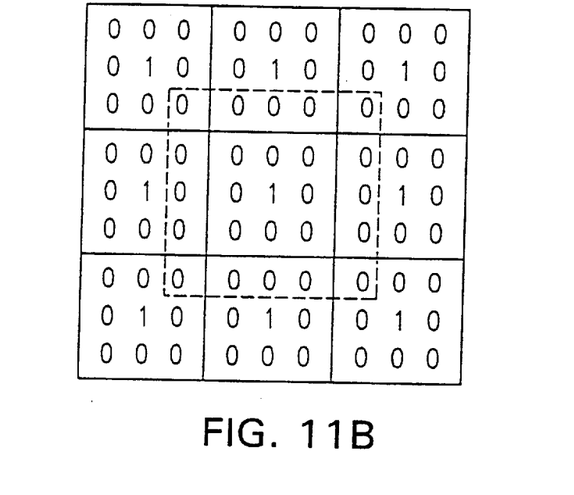

Second, the CPU 120 carries out the calculation for calculating gradation values of the pixels which form the dither pattern Bij shown at the center of FIG. 11B. The calculation is performed by using the conversion matrix Amn stored in the conversion matrix memory 121. If the gradation value at a center position (i, j) of the dither pattern Bij is represented by Tij, it is obtained by the following calculation.

$$Tij = (A00 \times Bi-1j-1 + A01 \times Bi-1j + A02 \times Bi-1j+1 + A10 \times Bij-1 + A11 \times Bij + A12 \times Bij+1 + A20 \times Bi+1j-1 + A21 \times Bi+1j + A22 \times Bi+1j+1)^2$$

Figure 11C:
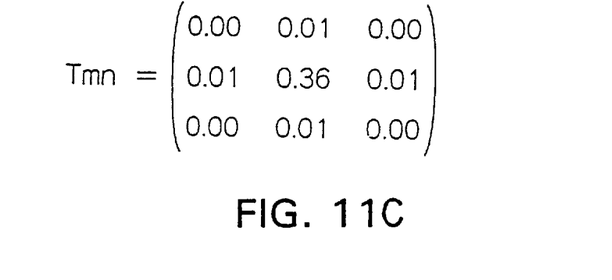

In this way, the other gradation values Ti−1j−1 to Ti+1j+1 at positions (i−1,j−1) to (i+1, j+1) in the dither pattern Bij are calculated. FIG. 11C shows a matrix representing the gray levels of the respective pixels obtained by the above calculation. The calculated matrix Tmn of FIG. 11C is stored in the RAM 122.

III) Subsequently, the CPU 120 calculates an average value of respective elements of the matrix Tmn.

$$(0.00+0.01+0.00+0.01+0.36+0.01+0.00+0.01+0.00)/(3\times3)=0.044$$

This value represents the gradation value corresponding to the dither pattern Bij shown in FIG. 11A, and is stored to the shreshold table 14b as the shreshold S. The thresholds of the others dither patterns are calculated by similarly carrying out the calculations. Results of threshold calculation are stored in the threshold table 14b in the order of smaller values. Since the thresholds are calculated as described above, the gradation values of the dither patterns are accurately and automatically calculated.

Figure 12:
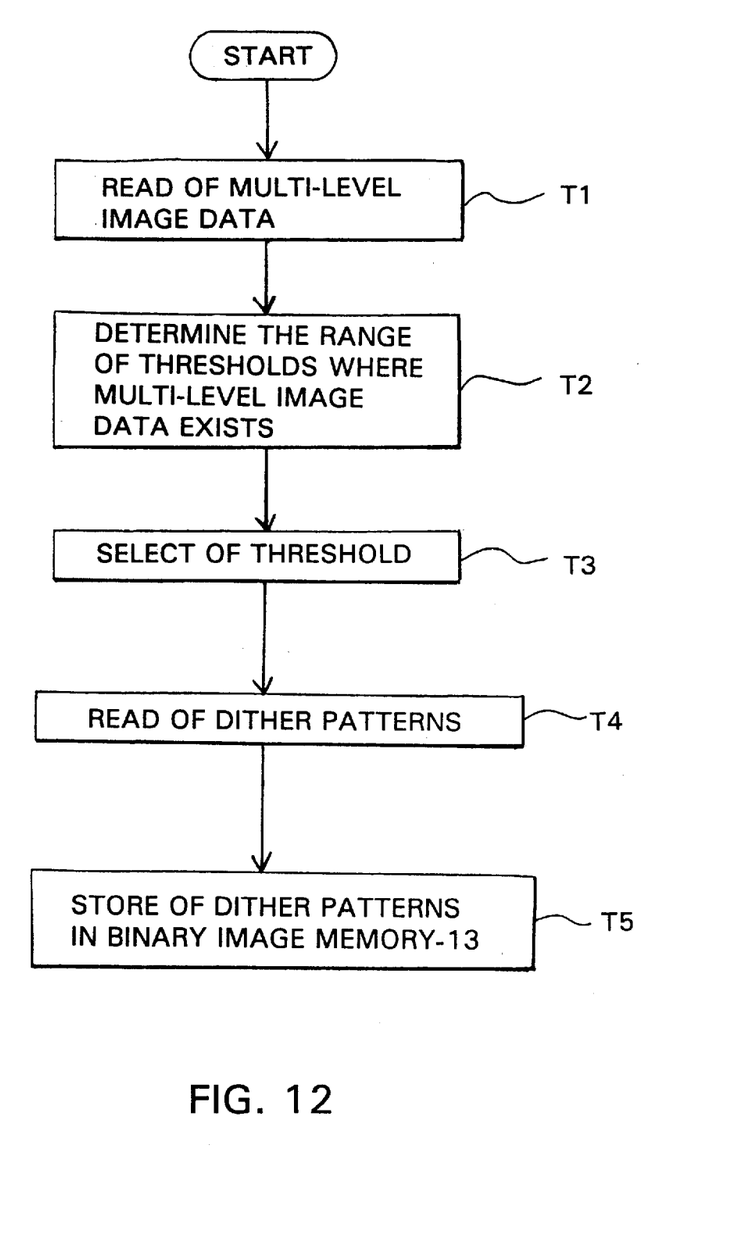
FIG. 12 is a flowchart of a control program for converting the dither image by the image conversion circuit.

FIG. 12 is a flowchart showing the operation of dither image conversion in the image conversion circuit 12 shown in FIG. 12.

In FIGS. 7 and 12, a control program for the dither image conversion is stored in the ROM 124. First, the CPU 120 reads the multi-level image data from the multi-level image memory 11 (FIG. 4) in the dither image conversion mode (step T1). Subsequently, the CPU 120 determines the range of thresholds where a gradation value K of the multi-level image data exists (step T2). For example, if the gradation value K is 0.55, the CPU 120 refers to the threshold table 14b shown in FIG. 5 and determines that $0.044 \leq K < 0.093$. The CPU 120 selects a lower threshold 0.044 for the gradation value K (step T3). Then the CPU 120 reads a dither pattern 140 corresponding to the selected threshold S=0.044 from the dither pattern memory 14a (step T4) and stores the dither pattern in the binary image memory 13 as binary image data (step T5).

When the image conversion circuit 12 converts a series of multi-level image data to the binary image data and stores the data in the binary image memory 13, the electrophotograph image forming unit 2 appropriately switches over the laser beam 202 (FIG. 6) to form an assemblage of dither patterns corresponding to the binary image data on the external periphery of the photoconductor drum 200 as the static latent image. The static latent image is developed as a toner image, fixed on a paper and outputted.

Figure 10:
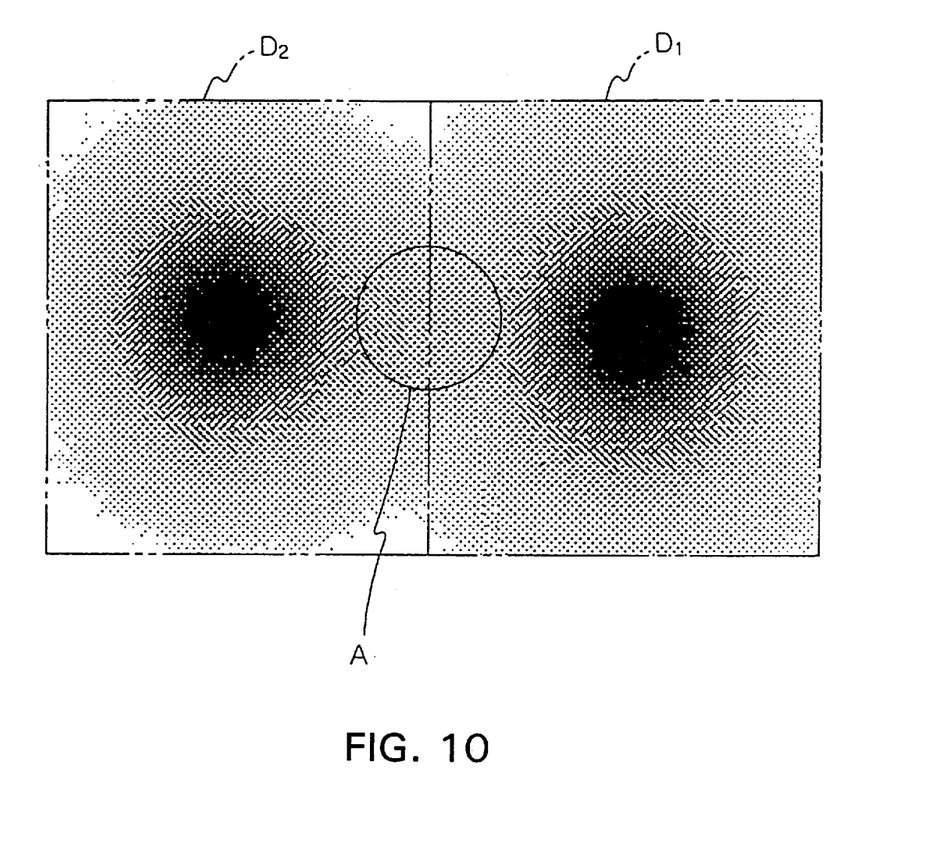
FIG. 10 is a diagram illustrating gray level enhancement which arises between adjacent pixels.

In this case, an intensity distribution of the laser beam for exposing the surface of the photoconductor drum 200 appears as a Gaussian distribution as shown in FIG. 10. The hem of the Gaussian distribution profile protrudes into adjacent pixels to affect a latent image of the adjacent portion. In FIG. 10, shows that one pixel D1 is affected by the left-side adjacent pixel D2, and an evidence of effect is found on a portion shown with symbol A. Actually the subject pixel is affected by upper and lower adjacent pixels, right and left-side adjacent pixels and slant adjacent pixels and a degree of effect is inversely proportional to a distance between adjacent pixels. It is known that a correlative effect of adjacent pixels is shared by almost all electrophotographic image forming units.

Figure 13:
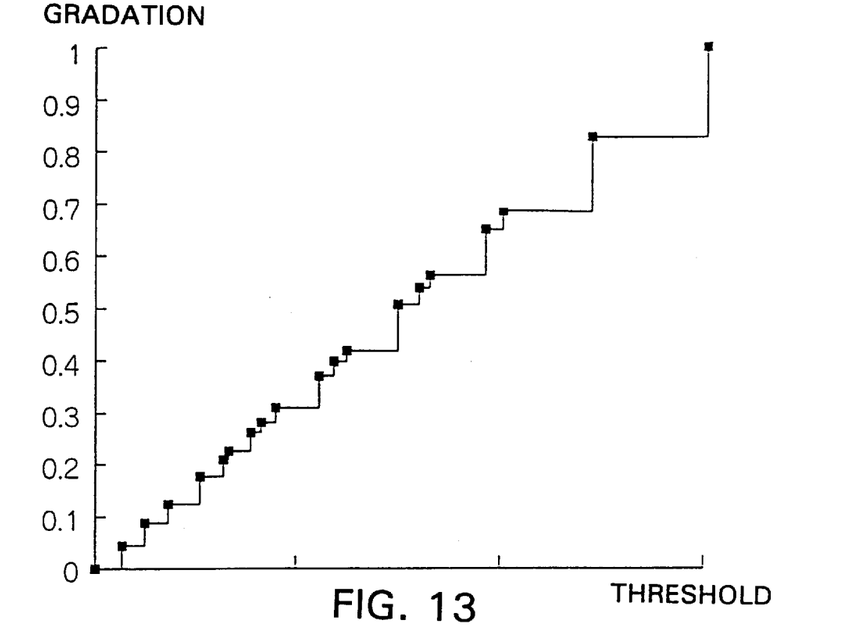
FIG. 13 is a graph showing the gray level gradation in the embodiments according to the present invention.
Figure 14:
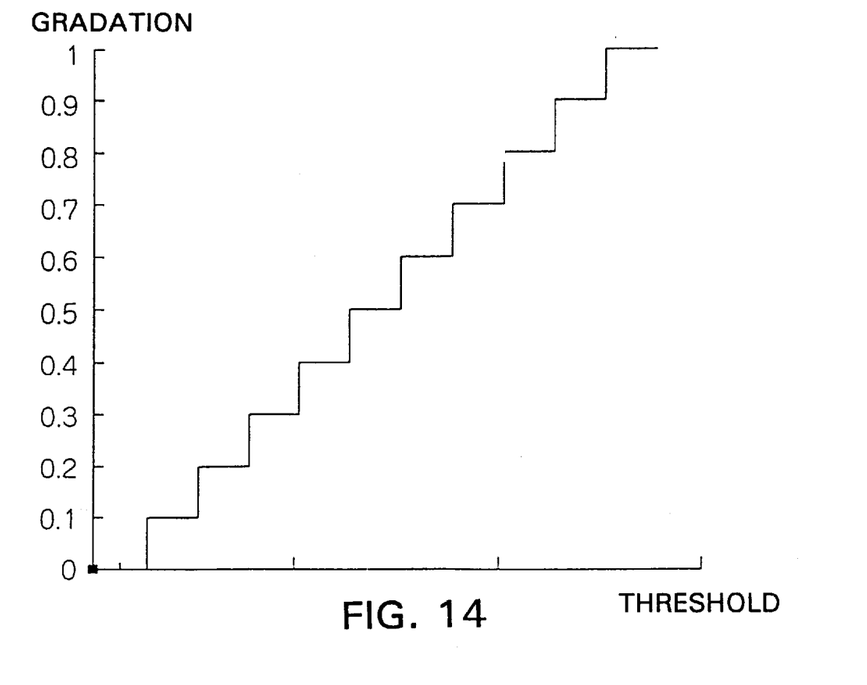
FIG. 14 is a graph showing a conventional gray level gradation for ten density levels.

In this embodiment, a specified gray level variations due to correlation between adjacent pixels are occurred by the variation of the ON bit position in the dither patterns having the same numbers of ON bits. Thus a plurality of gradations can be represented by changing the ON bit position. Specifically, 20 gradations can be represented by only the 3×3 dither matrix as shown in FIG. 13. From comparison of the above result with 10 gradations according to the conventional 3×3 dither matrix shown in FIG. 14, the two-fold gradations can be represented without deterioration of the resolution. Particularly, a bright portion of the image can be reproduced fidelity for each arrangement and it is that image reproduction is remarkably improved.

The image conversion circuit 12 selects an optimum dither pattern 140 by referring to the threshold table 14b for binary-coding multi-level image data, and therefore, complex calculation as the error diffusion method is not required for the image conversion and binary coding conversion can be carried out at a high speed.

The thresholds are calculated according to respective dither patterns 140 in a specified procedure by the threshold calculating function in the image conversion circuit 12, and the image conversion circuit 12 provides and preset in the threshold table 14b in accordance with the dither patterns 140. Accordingly, the correspondence of the gray level represented by multi-level image data and the gray level represented by binary image data is visually improved and the gray level of the half-tone image can be reproduce in high precision.

Thought the 3×3 array matrix is used as the dither matrix in this embodiment, a matrix having the other type of array such as a 4×4 array can be arranged. If the dither matrices are arranged, for example, in the 4×4 array, approximately 80 gradation levels can be theoretically represented and, from an experiment with an actual test sample, it is clarified that approximately 40 gradation levels as many as a half of the theoretically possible number can be reproduced. The dither patterns 140 in the present embodiment are only examples and other types of dither patterns can be used.

If the shape of the laser beam spot is oval, the thresholds an be calculated by setting the adjacent effect coefficient in the vertical direction and that in the horizontal direction to different values.

What is claimed is:

1. An image forming apparatus for forming a pseudo half-tone image on an image forming medium corresponding to multi-level image data having plenty of gradation values, comprising:

converting means for converting said multi-level image data to binary image data represented by pixels in a dither matrix; and an electrophotographic image forming device which includes a photoconductor drum as said image forming medium, and a device for forming a static latent image pixel by pixel on said photoconductor drum responsive to said binary image data by a laser light;

said converting means including, storage means for storing first dither patterns having different numbers of ON bits corresponding to black pixels and second dither patterns having the same size and the same number of ON bits with said first dither patterns and having different patterns;

threshold storing means for storing different threshold values representing gradation values of said first and second dither patterns, said different threshold values representing gradations determined by patterns of said first and second dither patterns and by a grey level variation caused by a Gaussian distribution of said laser light from adjacent ON bit positions in said first and second dither patterns;

selecting means for determining whether the gradation value of said multi-level image data exists between two adjacent threshold values stored in said threshold storing means and selecting one of said two adjacent threshold values; and means for reading from said storage means a dither pattern corresponding to the threshold value selected by said selecting means as said binary image data.

2. The image forming apparatus according to claim 1, further comprising calculating means for calculating said threshold values on the basis of said first and second dither patterns.

3. The image forming apparatus according to claim 2, said calculating means including:

means for selecting one of said first and second dither patterns from said storage means and generating a first matrix constructed by arraying the selected dither pattern periodically, said first matrix having a dither matrix Bij of said selected dither pattern in a center position;

means for calculating gradation values of pixels in said dither matrix Bij, each of said gradation values calculated by a square of a sum of each product of a value of each element in a conversion matrix and a value of each element in said first matrix having a pixel of which gradation is calculated, said value of each element of said conversion matrix representing a degree of a density variation affected by adjacent pixel; and means for calculating an average of the gradation values.

4. An image forming apparatus for forming a pseudo half-tone image on an image forming medium corresponding to multi-level image data having numerous gradation values, comprising:

a converter converting said multi-level image data to binary image data represented by pixels in a dither matrix; and an electrophotographic image forming device which includes a photoconductor drum as said image forming medium, and a device for forming a static latent image pixel by pixel on said photoconductor drum responsive to said binary image data by a laser light;

said converter including, a storage device storing first dither patterns having different numbers of ON bits corresponding to black pixels and second dither patterns having the same size and the same number of ON bits with said first dither patterns and having different patterns;

a threshold storing device storing different threshold values representing gradation values of said first and second dither patterns, said different threshold values representing gradations determined by patterns of said first and second dither patterns and by a grey level variation caused by a Gaussian distribution of said laser light from adjacent ON bit positions in said first and second dither patterns;

a selector determining whether the gradation value of said multi-level image data exists between two adjacent threshold values stored in said threshold storing device and selecting one of said two adjacent threshold values; and a reading device reading from said storage device a dither pattern corresponding to the threshold value selected by said selector as said binary image data.

5. The image forming apparatus according to claim 4, further comprising a calculating device calculating said threshold values on the basis of said first and second dither patterns.

6. The image forming apparatus according to claim 5, said calculating device including:

a selecting device selecting one of said first and second dither patterns from said storage device and generating a first matrix constructed by arraying the selected dither pattern periodically, said first matrix having a dither matrix Bij of said selected dither pattern in a center position;

a gradation values calculator calculating gradation values of pixels in said dither matrix Bij, each of said gradation values calculated by a square of a sum of each product of a value of each element in a conversion matrix and a value of each element in said first matrix having a pixel of which gradation is calculated, said value of each element of said conversion matrix representing a degree of a density variation affected by adjacent pixels; and an averaging calculator calculating an average of the gradation values.

* * * * *